(12) United States Patent
Kinzhalin et al.

(10) Patent No.: US 8,006,082 B2
(45) Date of Patent: Aug. 23, 2011

(54) DYNAMICALLY RECONFIGURING PLATFORM SETTINGS

(75) Inventors: Arzhan I. Kinzhalin, Córdoba (AR); Mario Bertogna, Córdoba (AR); Ricardo Morin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 12/286,225

(22) Filed: Sep. 29, 2008

(65) Prior Publication Data

US 2010/0082950 A1    Apr. 1, 2010

(51) Int. Cl.
*G06F 1/24* (2006.01)

(52) U.S. Cl. .............................. 713/100; 713/1; 709/221

(58) Field of Classification Search .............. 713/1, 100; 709/221
See application file for complete search history.

(56) References Cited

U.S. PATENT DOCUMENTS

| | | | | |
|---|---|---|---|---|
| 5,606,715 A | 2/1997 | Yishay et al. | | 712/43 |
| 5,671,435 A | 9/1997 | Alpert | | 712/38 |
| 5,732,207 A | 3/1998 | Allen et al. | | 715/5 |
| 5,854,913 A | 12/1998 | Goetz et al. | | 503/201 |
| 5,884,023 A * | 3/1999 | Swoboda et al. | | 714/30 |
| 5,889,679 A | 3/1999 | Henry et al. | | 716/17 |
| 6,574,712 B1 | 6/2003 | Kahle et al. | | 711/137 |
| 6,574,739 B1 * | 6/2003 | Kung et al. | | 713/322 |
| 6,615,344 B1 | 9/2003 | Hagen | | 713/1 |
| 6,662,274 B2 | 12/2003 | Subramoney et al. | | 711/137 |
| 6,675,263 B2 | 1/2004 | Anderson et al. | | 711/137 |
| 6,675,280 B2 | 1/2004 | Cooksey et al. | | 711/204 |
| 7,051,131 B1 * | 5/2006 | Wiedenman et al. | | 710/107 |
| 7,308,571 B2 | 12/2007 | Baragy et al. | | 713/100 |
| 7,818,624 B2 * | 10/2010 | Hunter et al. | | 714/39 |

FOREIGN PATENT DOCUMENTS

EP    0 218 335    4/1987

OTHER PUBLICATIONS

Boggs, Darrell, et al.; "The Microarchitecture of the Intel Pentium 4 Processor on 90nm Technology". Intel Technology Journal. vol. 8, Issue 1, Feb. 18, 2004.

* cited by examiner

*Primary Examiner* — Chun Cao
(74) *Attorney, Agent, or Firm* — Trop, Pruner & Hu, P.C.

(57) ABSTRACT

In one embodiment, a system may receive a pattern from an analysis engine, where the pattern includes information regarding a corrective action to be taken on a configuration setting of a processor, configure a performance monitor based on the pattern, collect performance monitoring information during program operation, analyze the information during the program operation, and dynamically implement the corrective action during the program operation based on the analysis. Other embodiments are described and claimed.

15 Claims, 3 Drawing Sheets

DYNAMICALLY RECONFIGURING PLATFORM SETTINGS

BACKGROUND

In today's complex computer systems, a variety of different components are provided such that a given system can have many different components that interact with each other. Furthermore, many computer systems are adapted for specialized workload processing, such as server computers that are adapted to perform given business processing tasks. Processors such as central processing units (CPUs) within these systems can have various features that are enabled or disabled via configuration settings of the processor.

In many computer platforms, a number of performance-sensitive processor and platform-specific settings are exposed as basic input/output system (BIOS) settings. Examples are hardware prefetch, second sector (i.e., adjacent sector) prefetch, snoop filter, high-bandwidth memory option, hyper-threading, among others. These settings, or knobs, have default settings according to validation benchmarking. Default settings are enforced by the BIOS on system boot, and are not changed without an update to the BIOS. A limited set of workloads is used to determine default settings and, therefore in many cases certain critical workloads suffer a performance penalty due to a configuration that does not suit them.

DETAILED DESCRIPTION

Figure 1:
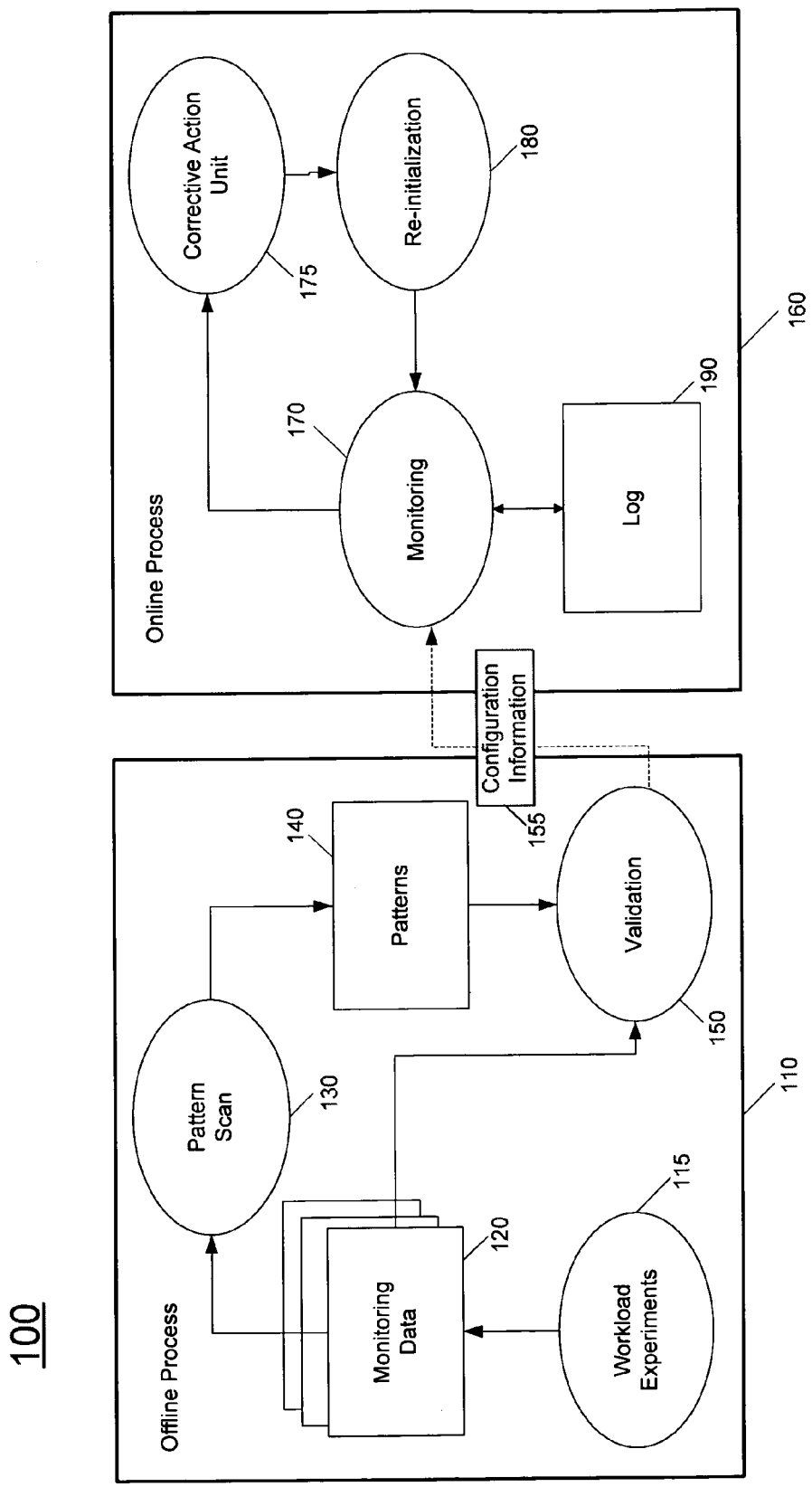
FIG. 1 is a block diagram of a software system in accordance with one embodiment of the present invention.

In various embodiments, a software system, referred to herein as an adaptive platform, can be used to observe behavior of system hardware and dynamically adjust configuration to achieve better performance. FIG. 1 is a block diagram of a software system in accordance with one embodiment of the present invention. As shown in FIG. 1, a software system that forms an adaptive platform 100 includes an offline process 110 and an online process 160. Offline process 110, illustrated on the left-hand side of FIG. 1, represents a separate software system from online process 160, which in turn is a separate software system.

Thus the adaptive platform includes two independent parts: an off-line analysis system (AS), also referred to herein as an offline process 110 and a run-time monitoring and decision-making system (DMS), also referred to herein as an online process 160. The inputs to the AS are raw hardware monitoring data, such as data collected by monitoring hardware during a workload run and, corresponding to that run, platform settings and user-defined workload metrics, such as transactions per second. The objective of the AS is to identify conditions observed on the hardware which, with a given probability (e.g., expressed as a percentage likelihood), would indicate that changing a particular platform setting will result in a boost in a human-defined workload metric. Such metrics may include, for example average depth of a memory request queue. Each particular set of conditions, platform setting, and probability of performance improvement associated with them is referred to as pattern. Patterns, in general, may have a corrective action associated with them. A corrective action is an action of changing settings of one or more hardware configurable parameters.

As shown in FIG. 1, offline process 110, which in various embodiments may be a manual or an automatic system, may be used to run workload experiments and obtain performance data therefrom and, based on such data, generate one or more patterns that can be used to reconfigure a system using online process 160. Specifically, as shown in FIG. 1, offline process 110 may perform workload experiments 115. While the scope of the present invention is not limited in this regard, in some embodiments such workload experiments may correspond to various benchmarks or particularized workloads for given types of data sets. A given workload experiment may be associated with a given type of program to be executed, e.g., a transaction processing workload may be used to set patterns for a transaction processing program to be executed during normal system operation. When executing these workloads, a performance monitoring unit (PMU) of the processor may obtain and store monitoring data 120. For example, a PMU may include a variety of counters, registers and other performance monitoring components that can be used to store counts and other information associated with a program's operation. For example, a hardware prefetcher counter may be configured to count the number of times a hardware prefetcher is used within a given program phase to obtain information corresponding to a correct branch taken or a counter may be used to count instructions retired (executed) during a given measurement period. Of course, a number of such counters and other performance monitoring components may be present in a given embodiment.

At the conclusion of the workload experiments a pattern scan 130 may be performed to obtain various patterns based on the execution and the information associated with monitoring data 120. In this way, offline process 110 may generate a plurality of patterns 140. Each such pattern may include a set of conditions, platform setting(s), and probability of performance improvement associated with such setting if a given corrective action (e.g., enabling or disabling of the configuration setting) is performed. Note that a pattern can be an inequation that includes a value that is normalized and may itself be based on multiple counters. Some embodiments may use a system of inequations, for example, to define a band (or stripe) of values. The patterns can also include information on how to configure a PMU for the associated pattern. In various embodiments, the patterns determined in offline process 110 can be stored a non-volatile memory, or in another manner.

Finally, offline process 110 may perform a validation phase 150 using the incoming patterns, as well as the monitoring data. When such patterns are validated so that it is anticipated that, based on the validation, improved performance may be realized by performing the corrective action, validation unit 150 may send configuration information 155 to online process 160. In various embodiments, configuration information 155 may be in the form of one or more patterns, each with an associated action to be taken if the pattern is determined to be met during system operation. In addition, the configuration information 155 may include information on hardware and configure the PMU for the associated pattern. For example, in the situation of a pattern corresponding to a mathematical inequality, such as whether a given counter has exceeded a threshold, when the inequality is true (i.e., the counter has exceeded the threshold) the associated corrective action may be implemented. In one embodiment, the configuration information may include a hierarchy of analyses, depending on the system's stage to observe more particular items. In this way, organization of analysis may be made easier, as the amount of factors of the system to be analyzed can be large, thus only a minimal number of choices may be monitored, e.g., depending on the previous action. Priority may also be controlled based on system operation. For example, if a high load is on a bus, e.g., a front side bus, then priority may be directed to metrics associated with the bus, or how the memory unit behaves, rather than prioritizing for other metrics.

Still referring to FIG. 1, online process 160 is further detailed. Based on the incoming configuration information 155, a monitoring process 170 may be performed. Such monitoring may correspond to monitoring of one or more performance components (such as of a PMU) during operation of a program to determine whether one or more patterns associated with such performance component has been met. In the example described above, assume that a counter of correct hardware prefetches exceeds a threshold set forth in one of the patterns. If so, control passes to the corrective action indicated by the associated process. For example, in various embodiments, such corrective action may correspond to a setting (or resetting) of one or more elements of one or more configuration registers of a processor. For example, assume a processor configuration register (PCR) includes a plurality of bits, each associated with a given component of the processor. Further, each such bit in a first state (e.g., a logic one) indicates the enabling of such hardware component and the resetting to a second state (e.g., logic zero) may indicate the disabling of such component. Accordingly, based on the indicated pattern, a corrective action unit 175 may enable or disable one or more such bits of the configuration register. In various implementations, different types of configuration registers may be present, for example, including a processor configuration register (PCR) and a machine-specific register (MSR) or other such configuration or control registers such as various control registers (e.g., CR4) of a given processor.

Referring still to FIG. 1, after a corrective action is taken, control passes to a reinitialization process 180, where the DMS may be reinitialized with its new configuration. Also, the system may wait for the processor to enter its "normal" state (stabilize) depending on how reconfiguration impacts the processor. After this, continued monitoring may occur via monitoring process 170. For example, in many implementations the changed configuration setting that is associated with a given counter may continue to be analyzed by further analysis of the counter during program execution to ensure that the configuration change aided (or at least did not hinder) program performance. In addition, various log information may be maintained in a log process 190. While the scope of the present invention is not limited in this regard, such log information may include an indication of the counts obtained and the corrective actions performed based on such count information. While shown with this particular implementation in the embodiment of FIG. 1, the scope of the present invention is not limited in this regard.

Thus in various embodiments, the DMS takes one or more pattern specifications as its input; configures a PMU to monitor the data as defined by the pattern specifications; dynamically monitors hardware performance counters (PMU events) and upon match with a pattern specification takes corrective action (i.e., re-configures the platform as suggested by pattern specification); waits until system behavior stabilizes; and continues monitoring as above.

The framework described herein is applicable to any platform that exposes hardware configuration settings, such as for server, desktop, and mobile markets. However, some embodiments may be more applicable to certain system types such as server markets (database management systems (DBMS), application servers, etc.) and high-performance computing environments. This is so, as workloads on such platforms have phases running long enough to enjoy the impact of the corrective action. Different implementations may take account of the time that it takes to change the configuration, e.g., servers may require more accurate, and therefore longer, measurements while desktop configuration changes may be more agile. Notebooks, as well as any other portable x86, may pay more attention to power consumption.

Figure 2:
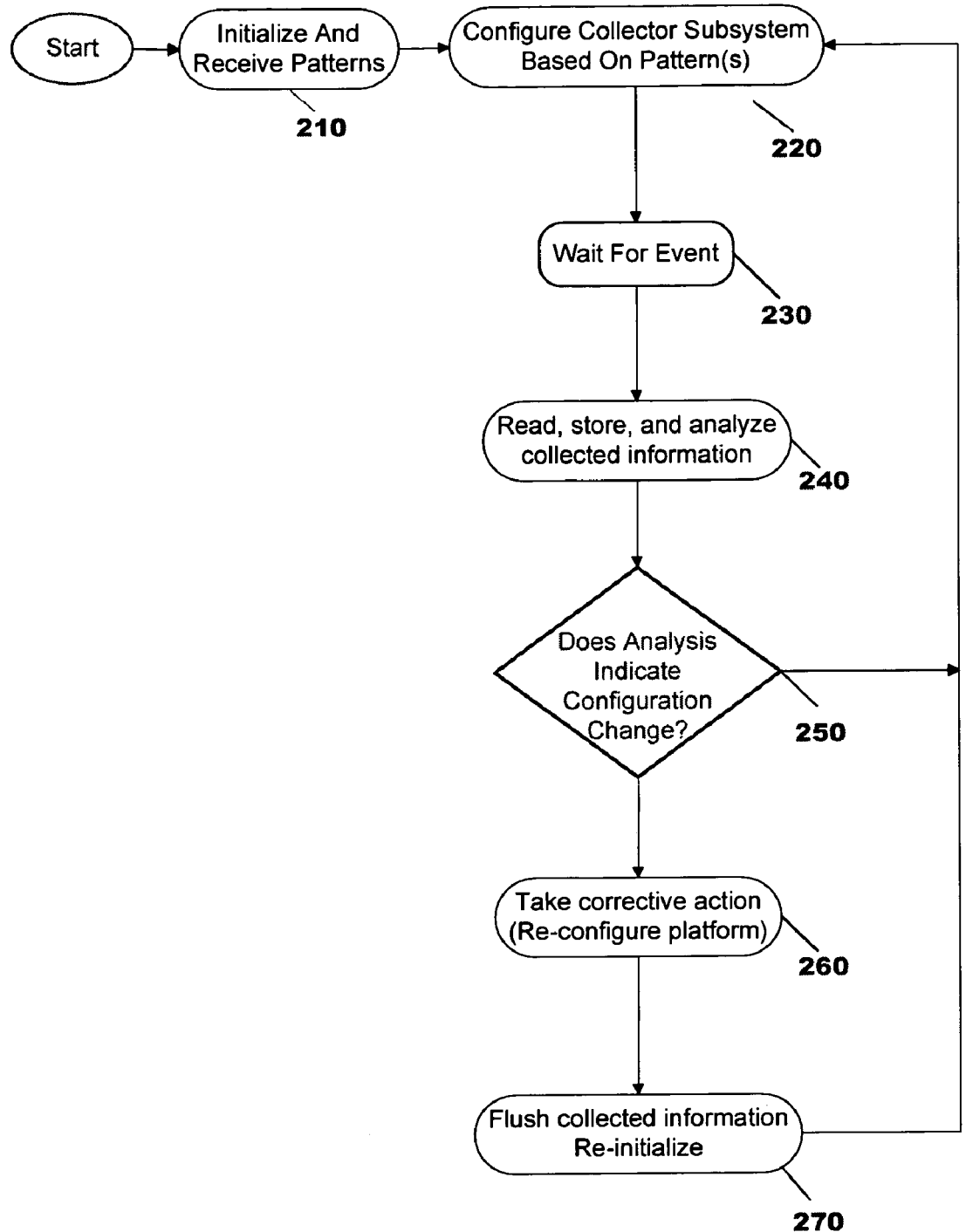
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to perform the online monitoring and re-configuring process of online process 160, set forth in FIG. 1. As shown in FIG. 2, method 200 may begin by performing an initialization process 210. Such initialization process may configure a processor according to its standard settings, e.g., as set forth in a platform's BIOS. In this way, various configuration settings of a processor, as set forth in configuration registers may be set so that the processor operates in accordance with these preset configuration settings from BIOS.

Next as shown in FIG. 2, pattern information may be received. Still further during the initialization, a collector subsystem may be configured using the pattern information (block 220). For example, a PMU including various counter and other performance monitoring components can be configured, e.g., initialized and configured to monitor certain performance characteristics based on the pattern information. Next, the online system may wait for an event to occur (block 230). While the scope of the present invention is not limited in this regard, such event may correspond to a timer event, interrupt or other mechanism to gain control of the system. Then, collected information from the performance monitors may be read, stored and analyzed (block 240). For example, assume that the online process is to analyze a hardware prefetcher's operation. Accordingly, the online process may obtain information regarding one or more counters associated with this prefetcher and analyze the collected information, e.g., by way of one or more patterns obtained from the offline process. In one embodiment, a pattern may represent a relatively simple mathematic inequation which, when holds true, indicates that a certain state of the system has been reached.

Then it may be determined based on this analysis whether the pattern(s) indicate a configuration change is appropriate (diamond 250). If not, control passes back to block 220 for further configuring of the collector system, e.g., to collect information associated with one or more other patterns such as according to a priority set forth in the configuration information. While, in general, a pattern may not necessarily have an action associated with it, patterns that are being looked for may generally have an associated action. If instead it is determined at diamond 250 that a change is indicated, control passes to block 260, where a corrective action may be taken, e.g., the enabling or disabling of this hardware prefetcher feature. Still further, a reconfiguration of the platform, e.g., by implementing this configuration setting change to the configuration of the processor may be performed.

Finally, at block 270 the collected information may be flushed and the collector subsystem may be reinitialized. Note that re-initialization may be performed because certain actions may incur changes in collector subsystems. As shown, control then passes back to block 220. Note method 200 does not have a final state/exit point. Instead, its lifetime may be the same as the lifetime of the container which contains the implementation. While shown and described with this particular implementation in the embodiment of FIG. 2, the scope of the present invention is not limited in this regard.

Embodiments can be implemented in variety of ways. However, in one embodiment, an operating system kernel thread may be used to implement the run-time analysis and adaptation. In other embodiments, a user-space agent, or other software can be used to monitor hardware performance data and change system configuration of the hardware, such as one or more configuration registers of a processor.

Thus in various embodiments, dynamic adaptation of a hardware configuration can be realized while the workload is running on the platform. One of the advantages is that the system is application-agnostic and is not intrusive. In contrast, in current systems hardware configuration is initialized by BIOS and remains static, which in many cases hurts performance of the applications.

Figure 3:
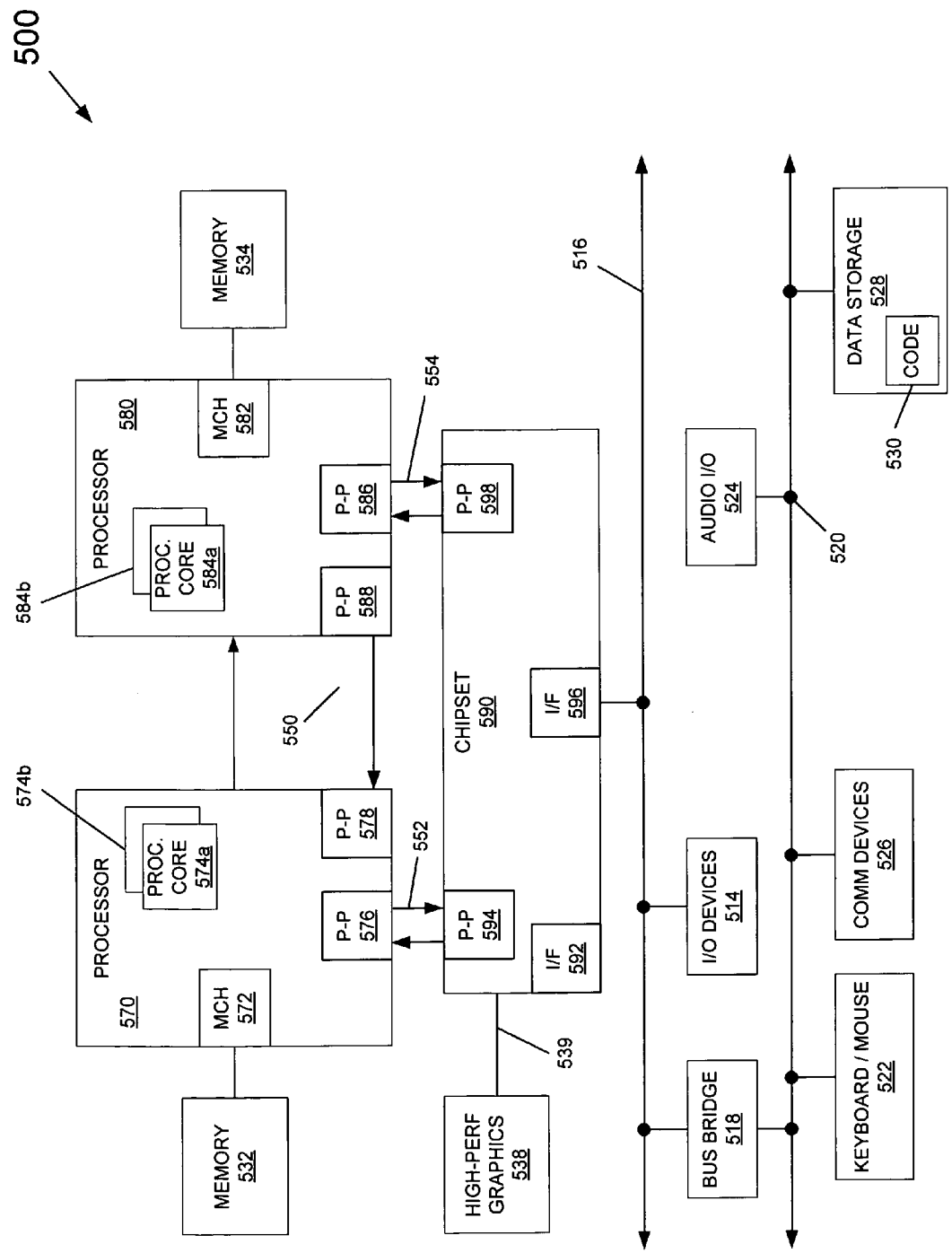
FIG. 3 is a block diagram of a system in accordance with an embodiment of the present invention.

Embodiments may be implemented in many different system types. Referring now to FIG. 3, shown is a block diagram of a system in accordance with an embodiment of the present invention. As shown in FIG. 3, multiprocessor system 500 is a point-to-point interconnect system, and includes a first processor 570 and a second processor 580 coupled via a point-to-point interconnect 550. As shown in FIG. 3, each of processors 570 and 580 may be multicore processors, including first and second processor cores (i.e., processor cores 574a and 574b and processor cores 584a and 584b), although potentially many more cores may be present in the processors. The processor cores may include performance monitors and may be dynamically re-configured in accordance with an embodiment of the present invention based on pattern information and collected data from the performance monitors that is operated on by the adaptive platform.

Still referring to FIG. 3, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 2, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 3, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 3, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving pattern information from an offline analysis system, the pattern information including at least one mathematical inequality associated with a performance monitoring unit (PMU) of a processor, the pattern information generated by the offline analysis system based on monitoring data obtained during a workload experiment;
configuring the PMU based on the pattern information, wherein the pattern information includes an indication of one or more components of the PMU to be enabled;
collecting performance monitoring information from the one or more components of the PMU during operation of a program and analyzing the performance monitoring information; and
implementing a corrective action associated with the pattern information based on the analysis, wherein the corrective action is to update at least one configuration setting of the processor.

2. The method of claim 1, further comprising dynamically updating the at least one configuration setting during operation of the processor executing the program.

3. The method of claim 2, further comprising dynamically updating the at least one configuration setting transparently to a user.

4. The method of claim 1, wherein updating the at least one configuration setting is to change at least one setting of a configuration register of the processor, wherein the at least one setting was set by a basic input/output system (BIOS).

5. The method of claim 1, wherein the offline analysis system performs an offline analysis on the workload experiment corresponding to a benchmark.

6. The method of claim 1, further comprising generating a priority list of a plurality of configuration settings and iteratively updating each of the plurality of configuration settings, based on iteratively collecting performance monitoring information associated with the corresponding configuration setting according to the pattern information.

7. An article comprising a machine-accessible storage medium including instructions that when executed cause a system to:
receive a pattern from an analysis engine, the pattern including at least one mathematical inequality associated with at least one counter of a performance monitoring unit (PMU) of a processor of the system and a corrective action to be taken on at least one configuration setting of the processor stored in a configuration register of the processor;
configure the PMU based on the pattern;
collect performance monitoring information in the PMU during operation of a program and analyze the performance monitoring information during the program operation; and
dynamically implement the corrective action during the program operation based on the analysis.

8. The article of claim 7, further comprising instructions that when executed enable the system to dynamically implement the corrective action transparently to a user.

9. The article of claim 8, further comprising instructions that when executed enable the system to update the at least one configuration setting to change at least one setting of the configuration register of the processor, wherein the at least one setting was set by a basic input/output system (BIOS).

10. The article of claim 7, further comprising instructions that when executed enable the system to perform an offline analysis using the analysis engine on a first workload corresponding to a benchmark and generate the pattern based on monitoring data obtained during the first workload.

11. A system comprising:
a processor to execute instructions; and
a memory coupled to the processor, the memory including instructions to receive pattern information from an offline analysis system, the pattern information including at least one mathematical inequality associated with a performance monitoring unit (PMU) of the processor, the pattern information generated by the offline analysis system based on monitoring data obtained during a workload experiment, configure the PMU based on the pattern information, collect performance monitoring information from the configured PMU during operation of a program, analyze the performance monitoring information, and implement a corrective action associated with the pattern information based on the analysis, wherein the corrective action is to update at least one configuration setting of the processor.

12. The system of claim 11, wherein the instructions further enable the system to dynamically update the at least one configuration setting during operation of the processor executing the program.

13. The system of claim 12, wherein the instructions further enable the system to dynamically update the at least one configuration setting transparently to a user.

14. The system of claim 12, wherein the instructions further enable the system to update the at least one configuration setting to change at least one setting of a configuration register of the processor, wherein the at least one setting was set by a basic input/output system (BIOS).

15. The system of claim 11, wherein the pattern information is to identify one or more components of the PMU for enabling.

* * * * *